(No Model.)

F. ROSEBROOK.
COFFEE AND TEA POT.

No. 291,941. Patented Jan. 15, 1884.

WITNESSES:
Theo. G. Hoster
C. Sedgwick

INVENTOR:
F. Rosebrook
BY Munn & Co
ATTORNEYS.

N. PETERS, Photo-Lithographer, Washington, D. C.

UNITED STATES PATENT OFFICE.

FRANK ROSEBROOK, OF ELMIRA, NEW YORK.

COFFEE AND TEA POT.

SPECIFICATION forming part of Letters Patent No. 291,941, dated January 15, 1884.

Application filed April 13, 1883. (No model.)

*To all whom it may concern:*

Be it known that I, FRANK ROSEBROOK, of Elmira, in the county of Chemung and State of New York, have invented a new and Improved Tea and Coffee Maker, of which the following is a full, clear, and exact description.

The object of my invention is to provide a new and improved apparatus for making tea and coffee in such a manner that none of the flavor or aroma in the tea or coffee will be lost.

Reference is to be had to the accompanying drawings, forming part of this specification, in which similar letters of reference indicate corresponding parts in all the figures.

Figure 1:
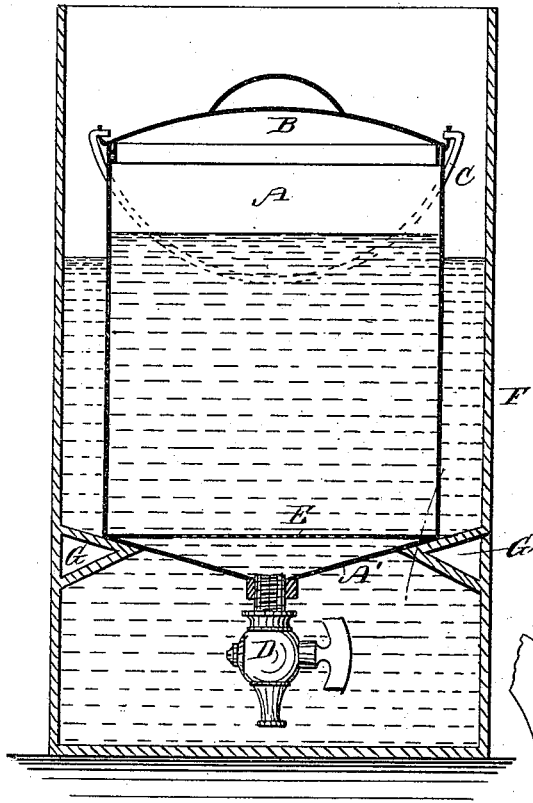
Figure 2:
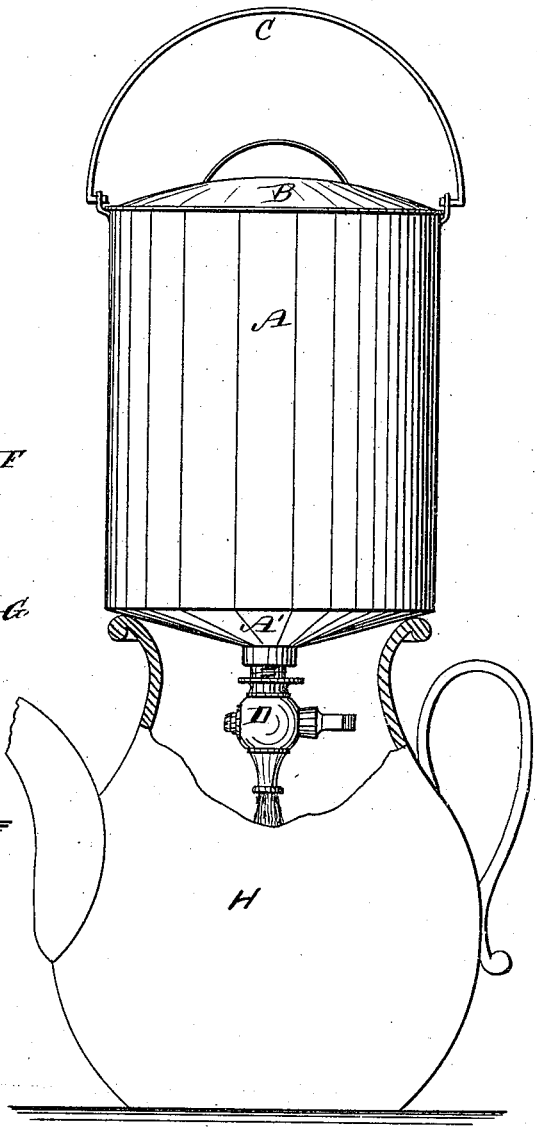
Figure 3:
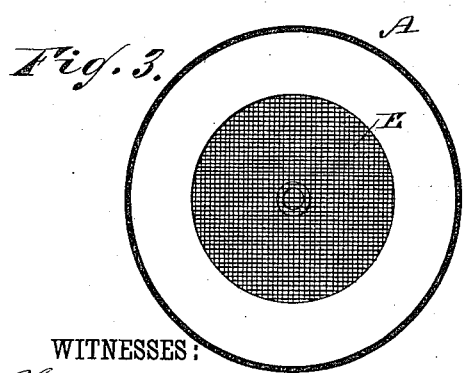

Figure 1 is a cross-sectional elevation of my improved tea and coffee maker. Fig. 2 is a longitudinal elevation of the vessel containing the tea or coffee and of the tea or coffee pot, showing the manner in which the fluid coffee or tea is drained from the leaves or grounds. Fig. 3 is a sectional plan view of the vessel for containing the coffee.

A vessel or can, A, provided with a cover, B, and a bail or handle, C, in the usual manner, has a tapering or conical bottom, A', and to the middle of the same a cock or faucet, D, is attached, which projects downward from the bottom of the vessel. A perforated floor or a strainer, E, is secured in the vessel directly above the bottom A', which strainer E can be made removable, if desired.

The tea or coffee is placed in the vessel A above the strainer, and then a greater or less quantity of water is poured into the vessel A, which is then placed in a larger vessel, F, which is provided on its inner surface with a series of projections, G, or a ring, on which the vessel A can rest. Water is then poured into the outer vessel, F, and the said vessel is placed on a stove or over some suitable lamp, which causes the water in the outer vessel, F, to boil. Thereby the water in the vessel A will be heated sufficiently to extract the flavor and aroma from the tea or coffee. None of the flavor, aroma, &c., of the tea or coffee can escape, as the water in the kettle or vessel A cannot be heated sufficiently to cause it to boil, as the said water is not heated by radiant heat, but by the water bath in the vessel A, the temperature of which cannot rise above the boiling-point, as the top of the vessel is open. The cover B is placed on the vessel A to guard absolutely against the escape of any of the aroma. If the tea or coffee is to be drained off into a tea or coffee pot, H, the cock or faucet D is opened and the kettle A is placed on the pot H, in the manner shown in Fig. 2, and the liquid tea or coffee then passes into the same. The coffee-grounds or extracted tea-leaves remain in the vessel A.

Having thus described my invention, what I claim as new, and desire to secure by Letters Patent, is—

The combination, with the vessel F, having projections G or a ring on its inner surface, of the vessel A, provided on its bottom with a faucet or cock, D, and with a strainer, E, above the bottom, substantially as herein shown and described, and for the purpose set forth.

FRANK ROSEBROOK.

Witnesses:
R. L. GUION,
E. H. DAVIS.